United States Patent
Neuhoff et al.

(10) Patent No.: US 10,275,964 B2
(45) Date of Patent: Apr. 30, 2019

(54) PORTABLE ID-TRANSMITTER FOR AN AUTHENTICATION SYSTEM AND AN AUTHENTICATION OPERATING SYSTEM FOR USE THEREWITH

(71) Applicants: Stefan Neuhoff, Essen (DE); Mirko Schindler, Velbert (DE)

(72) Inventors: Stefan Neuhoff, Essen (DE); Mirko Schindler, Velbert (DE)

(73) Assignee: Huf Huelsbeck & Fuerst GmbH & Co. KG, Velbert (DE)

(*) Notice: Subject to any disclaimer, the term of this patent is extended or adjusted under 35 U.S.C. 154(b) by 0 days.

(21) Appl. No.: 15/910,572

(22) Filed: Mar. 2, 2018

(65) Prior Publication Data
US 2018/0315266 A1    Nov. 1, 2018

(30) Foreign Application Priority Data

Apr. 28, 2017 (DE) .................. 10 2017 109 295
Sep. 6, 2017 (DE) .................. 10 2017 120 524

(51) Int. Cl.
G07C 9/00       (2006.01)
H04B 1/7163     (2011.01)

(52) U.S. Cl.
CPC ..... *G07C 9/00309* (2013.01); *G07C 9/00007* (2013.01); *H04B 1/7163* (2013.01); *G07C 2009/00388* (2013.01); *G07C 2009/00769* (2013.01); *H04B 1/71632* (2013.01)

(58) Field of Classification Search
None
See application file for complete search history.

(56) References Cited

U.S. PATENT DOCUMENTS

| 2015/0170444 | A1* | 6/2015 | Yasui | G07C 9/00007 340/5.61 |
| 2015/0291126 | A1* | 10/2015 | Nicholls | B60R 25/2054 701/49 |
| 2016/0234008 | A1* | 8/2016 | Hekstra | H04W 4/80 |
| 2017/0285634 | A1* | 10/2017 | Chin | G05D 1/0022 |
| 2018/0093642 | A1* | 4/2018 | Casagrande | B60R 25/24 |
| 2018/0162321 | A1* | 6/2018 | Spiess | B60R 25/246 |

FOREIGN PATENT DOCUMENTS

| EP | 0 965 710 A2 | 12/1999 |
| EP | 1 447 775 A2 | 8/2004 |
| EP | 2 800 068 A2 | 11/2014 |
| EP | 2 813 963 A1 | 12/2014 |
| GB | 2538341 A | 11/2016 |
| WO | WO 2016/046105 A1 | 3/2016 |
| WO | WO 2016/059451 A1 | 4/2016 |

OTHER PUBLICATIONS

European Search Report of European Application Serial No. EP 18154674 dated Sep. 13, 2018, 17 pages.

* cited by examiner

*Primary Examiner* — Carlos Garcia
(74) *Attorney, Agent, or Firm* — Fay Sharpe LLP

(57) ABSTRACT

A portable ID transmitter for an authentication system of a vehicle includes a supply battery, a micro controller, UWB transmitting and receiving circuits controlled by the microcontroller for communication with a vehicle-side control device, and an LF receiving circuit controlled with the microcontroller for receiving LF wake-up signals transmitted in the LF frequency range, all arranged in a housing.

12 Claims, 2 Drawing Sheets

PORTABLE ID-TRANSMITTER FOR AN AUTHENTICATION SYSTEM AND AN AUTHENTICATION OPERATING SYSTEM FOR USE THEREWITH

BACKGROUND

The invention relates to a portable ID transmitter for an authentication system and a method for operating the authentication system. In particular, the invention refers to an authentication system with which a portable ID transmitter can be authenticated to the vehicle to enable vehicle functions for an operator carrying the portable ID transmitter.

In prior art, different so-called keyless access systems are disclosed. They are based on radio communication between a vehicle infrastructure and a portable ID transmitter. In the context of the radio communication carried out, the desired authentication is performed, for example, by exchanging and checking encrypted authorization data.

The use of low-frequency (LF) and high-frequency (HF) radio waves is known and widely used in keyless access systems. In prior art, combined communication using LF/HF systems has also been disclosed.

With radio-based authorization systems, security, especially against compromising the radio communication carried out, is of decisive importance. When releasing a vehicle function using portable ID transmitters, the determination of a position, a distance, or a similar quantity, for example, to check the plausibility of bidirectional communication, is known from prior art. For example, it is known to evaluate the signal strength of an LF radio communication between a portable ID transmitter and a vehicle authentication system. A supplementary or alternative concept to increase security against compromise can simply be based on limiting the transmission power of an LF communication. By limiting the transmission power of an LF communication between vehicle and ID transmitter, it is ensured that, for example, an LF alert signal transmitted from the vehicle to the ID transmitter can only be received by the other communication partner if a maximum distance between ID transmitter and vehicle is not exceeded.

Many of the well-known authentication systems still have the fundamental disadvantage that an LF radio communication or an HF radio communication can be extended, for example, in the context of so-called relay station attacks. To avoid such or other compromises, countermeasures are necessary some of which, however, are quite costly.

Therefore, it is the objective of the invention to improve the well-known authentication methods so that they provide an effective, but at the same time comparatively inexpensive protection against a compromise of the transmitted signals.

BRIEF SUMMARY

According to the invention, the objective is achieved with a portable ID transmitter having the characteristics of claim 1 and with a method having the characteristics of claim 12.

According to the invention, a portable ID transmitter for a vehicle authentication system is provided. The ID transmitter comprises in a housing:
  a supply battery,
  a microcontroller,
  UWB transmission and reception circuits controlled by the microcontroller for communication with a vehicle control unit,
  an LF reception circuit coupled with the microcontroller for receiving LF alert signals transmitted in the LF frequency range.

The microcontroller is arranged to transmit, when the LF reception circuit has received an LF alert signal, a UWB signal for reception through a UWB interface of the vehicle, which is coupled with the vehicle control unit. Furthermore, the microcontroller is arranged to detect the reception of a UWB response signal by the UWB transmission and reception circuits, which also have a suitable UWB antenna. In response to the recorded UWB response signal, the microcontroller can detect and evaluate the time difference between transmitting the UWB signal and receiving the UWB response signal. The result of the estimation can be evaluated by the microcontroller to determine whether the time difference or a value derived from the time difference does not exceed a predetermined maximum value. According to the invention, the microcontroller is configured to transmit a radio signal to the vehicle control unit, which has a release value, depending on the result of the test.

An essential aspect of the inventive method is based on the use of ultra-wideband communication.

In principle, the use of ultra-wideband radio signals (UWB radio signals) is known for some prior art applications. However, market-ready transceivers have only recently become available for use.

The fundamentals of ultra-wideband technology have been known for a long time. However, only recently this technology has become accessible for use in a wide range of applications, not least through more liberal regulation.

Ultra-wideband technology involves a short-range radio communication based on the transmission of short signal pulses, which covers a plurality of frequencies within a large frequency bandwidth. In particular, the width of the frequency ranges covered depends on the regulatory requirements of the corresponding territorial area. For example, signals are modulated with On/Off keying, pulse amplitude modulation, or pulse position modulation.

A disadvantage of UWB communication in relation to established LF and/or HF communication is the comparatively high energy requirement of many transceivers currently available and suitable for UWB communication.

However, UWB communication has the basic advantage that, due to the transmission of pulses, a distance is determined using a runtime-based approach, which is often referred to as the time-of-flight method. For example, the distance between the first UWB antenna and the portable ID transmitter can be determined by transmitting a UWB signal from the first UWB antenna to the portable ID transmitter, which is responding to by a UWB transceiver of the portable ID transmitter, and the recorded response signal is evaluated by a unit coupled with the first UWB antenna, for example, a control means. This takes place by evaluating the time elapsed between transmission and reception. The distance to the ID transmitter, the processing time within the ID transmitter, and the distance from the ID transmitter to the first UWB antenna are taken into account. If, as in this example, the running time is evaluated on the vehicle, only the processing time must be stored on the vehicle within the ID transmitter, so that a corresponding correction of the time measured on the vehicle can be made between transmission of the UWB signal and reception of the UWB response.

Experience has shown that the accuracy of such a UWB-based distance determination is significantly higher at the magnitude of distances usually provided than is the case of other methods, such as signal strength determination, usually using RSSI measurement of HF or BLE communication. With the UWB-based distance determinations, accuracy frequently ranges between 10 and 20 cm.

Because the pure running time of the UWB signal is relatively short compared to the processing time, due to the unexpectedly long total time between transmission of a UWB signal and reception of the corresponding response, it would be possible to detect an additional processing of the signal, for example, for manipulating the signal in the context of a relay station attack. Therefore, compromises, for example, in the type of the relay station attacks described, are only possible with very complex methods, if at all.

Another advantage resulting from the use of UWB signals is that due to the plurality of frequencies used, shading of the signals is very unlikely. This is because for at least some of the frequencies used simultaneously there is probably always a line of sight between the transmitter and receiver. One reason for this is that for some frequencies diffraction effects or reflections can be expected.

According to the invention, it is provided that the ID transmitter is equipped with hardware (sufficient computing power, storage means with sufficient storage capacity) and programmed in such a way that it can determine completely independently the distance of the ID transmitter from a vehicle that has a UWB interface. The performance of this determination comprises the transmission of a UWB signal by means of which a vehicle UWB transceiver and/or a vehicle UWB antenna (which is coupled to a control unit) correspondingly adapted to the ID transmitter is caused to emit a UWB response signal.

Furthermore, the determination comprises the correction of the time elapsed between transmission of the UWB signal and reception of the UWB response signal by the time period for reception, evaluation, and transmission processes required by the vehicle infrastructure as previously specified to the ID transmitter.

Basically, the essential aspect involves checking whether the time difference detected is smaller than the specified maximum time difference. The latter is predetermined in knowledge of the electronically conditioned latency and as a specification of the maximum granted running time of the radio radiation, which is directly linked to a maximum tolerated distance. For example, the electronically induced latency results from signal processing in the vehicle's control system.

The process of causing and recording the distance has the advantage that the ID transmitter is already aware—in contrast to the vehicle—that it is in the vicinity of the vehicle because the LF signal has already alerted the ID transmitter. The distance measurement can thus begin without requiring a triggering process on the part of the motor vehicle. This can potentially reduce the time required to determine the distance. A further advantage involves that the LF signals, whose reception requires only very low energy consumption, have already produced an initial pre-selection of ID transmitters to be potentially addressed. The number of UWB communications to be carried out on the vehicle can thus be significantly reduced, which results in energy savings.

Preferably, the radio signal involves a UWB signal.

If the check by the ID transmitter shows that the time difference does not exceed the predetermined value, the vehicle control unit is informed. For this purpose, a release value is transmitted by means of a radio signal, in the simplest case, for example, a binary value or a code, which informs the vehicle control unit that the distance test by the ID transmitter has led to the desired result.

According to one embodiment, the microcontroller is configured to transmit an authorization code by means of the radio signal.

For example, it can be provided that a challenge-response list may be stored on a storage medium of the ID transmitter, which storage medium is coupled with the microcontroller. At the same time, it can be provided that the microcontroller is configured to transmit by means of the radio signal a response value assigned to the challenge value if the UWB response signal comprises a challenge value.

According to a preferred further development, the ID transmitter is configured to test a plurality of LF signals for identity identification, acquire signal strength values for the LF signals, and respond to the reception of the LF signals with a HF response signal. Preferably, the HF response signal comprises the identity identifiers of the LF signal with the strongest signal strength value and/or a list of identity identifiers with the associated signal strength values.

This information can be used when implementing a suitable method, for example, by a vehicle control unit, to prioritize the UWB antennas from a plurality of UWB antennas spaced apart on the vehicle, as to which of the UWB antennas is preferably controlled.

A predetermined minimum time interval after the HF response signal can be provided for the UWB response signal. As a result, it is possible to anticipate an expected further movement of an operator towards the vehicle. This increases the probability that the operator is sufficiently close to the vehicle that it is reached by the UWB signal. This eliminates the need to transmit an additional UWB signal if the minimum time interval (by empiricism and depending on the false triggers accepted) is suitably adjusted.

According to one embodiment, the microcontroller can perform LF/HF communication and UWB communication at least partially in parallel, with the advantage of saving time.

According to a further embodiment, it can be provided that the LF reception circuit and/or the UWB transmission and reception circuits are configured to assume an energy-reduced state in which they are not ready for reception and not ready for transmission compared to their normal operating state, and are coupled to a motion sensor in such a way that when the ID transmitter is moved, the LF reception circuit and/or the UWB transmission and reception circuits are transferred into the normal operating state.

Furthermore, it can be provided that the ID transmitter is configured in the form of an ID transmitter that can be activated in an exclusively passive manner, the housing of which is configured with an operating element that cannot be activated manually. As a result, the ID transmitter can be used as a key fob and serves only for passive function release.

For key fob functionality, the ID transmitter can have a mechanical coupling element for coupling a key.

A second ID transmitter can be provided, which is configured in the form of a manual HF radio key in such a way that by manual actuation of a button arranged on the second ID transmitter, an HF request signal adapted to the vehicle control unit is transmitted to request a vehicle function. Together with the ID transmitter, the second ID provider forms an authentication system. The two ID encoders of the authentication system can be mechanically connected to each other with the mechanical coupling element, for example, a key ring, whereby no communication between the two is permitted.

According to this idea, a key system consisting of the ID transmitter and the second ID transmitter is provided, the keys being configured for communication with the same vehicle but not for communication with each other. This concept enables a physical separation between passive ID transmitter and active ID transmitter (the second ID transmitter), which has the advantage that two ID transmitters working independently of each other, depending on their equipment, are each allowed complete authentication to the vehicle and can therefore also be used separately from each other. However, if one of them is not functional, for example, due to an empty battery, both can also serve as a backup for each other.

Another idea of the invention relates to a method. The method provides for a vehicle authentication system to be operated in order to authenticate a portable ID transmitter to the vehicle. The authentication has the purpose of releasing a vehicle function for an operator carrying the portable ID transmitter.

The authentication system comprises the portable ID transmitter and a vehicle authentication arrangement.

The authentication arrangement comprises a plurality of UWB antennas, at least a first UWB antenna and a second UWB antenna. The first UWB antenna and the second UWB antenna are spaced apart on the vehicle. The method provides at least the following steps:

A) selecting a UWB antenna from the plurality of UWB antennas in the authentication arrangement as the selected UWB antenna. The UWB antenna must be selected at least
- depending on a received signal strength or multiple received signal strengths of at least one LF signal transmitted between the authentication arrangement and the ID transmitter, and/or
- depending on a received signal strength or multiple received signal strengths of at least one HF signal transmitted between the ID transmitter and the authentication arrangement, with both transmission directions being possible, and/or
- depending on at least one proximity signal from one or more proximity sensors located on the vehicle;

B) controlling the selected UWB antenna to perform UWB communication between the ID transmitter and the authentication arrangement;

C) performing the UWB communication between the ID transmitter and the authentication arrangement;

D) detecting the running time of a UWB signal of the UWB communication between the ID transmitter and the selected UWB antenna;

E) checking whether the running time of the UWB signal is less than a predetermined maximum running time.

According to the invention, a selected UWB antenna is chosen from the plurality of UWB antennas before controlling the selected UWB antenna to perform UWB communication. By choosing the selected UWB antenna, it is possible under favorable circumstances to obtain the information required for distance determination by controlling only a part of the UWB antennas of the authentication arrangement. If this is the case, further UWB communication using the other existing UWB antennas of the authentication arrangement can be relinquished. Thus, with the inventive method, it can be achieved that the energy required to perform UWB communication during an authentication process is reduced in an advantageous manner.

Preferably, the first UWB antenna is part of a first UWB transceiver and the second UWB antenna is part of a second UWB transceiver. This allows for a compact design and simple configuration.

According to the invention, it is provided that the selected UWB antenna is controlled. By controlling the selected UWB antenna, it is possible to enable UWB communication between the ID transmitter and the authentication arrangement.

For the transmission of a UWB signal, the ID transmitter described above is used, which, in turn, triggers via a UWB transmission and reception circuit (preferably configured in the form of a UWB transceiver) the transmission of a UWB signal, which is then detected and receives a response by the selected UWB antenna, whereupon the response transmitted as a UWB signal is detected and evaluated by the ID transmitter.

For example, to technically control the selected UWB antenna, it can be provided that the authentication arrangement comprises UWB transceivers, which include a UWB antenna as a component. For example, during normal operation, it can be provided that the first UWB transceiver is in a non-transmission and non-reception-ready state with the first UWB antenna, and, after a UWB antenna selecting has been selected, a vehicle control unit controls the UWB transceiver with the selected UWB antenna to put the UWB antenna into a reception-ready state. Alternatively, it can also be provided that the vehicle control unit sets the UWB antenna into an analogous state ready for transmission and triggers the transmission of the mentioned UWB signal via the selected UWB antenna.

By transmitting a UWB signal and responding to the UWB signal, the UWB communication provided for in the invention has been carried out. Subsequently, the running time of the UWB signal can recorded and the proposed test can be made of whether the running time of the UWB signal is less than a predetermined maximum running time.

If the running time of the UWB signal is less than a predetermined maximum running time, it can be assumed that on the vehicle no extension of the bidirectional UWB communication has been carried out. Depending on the safety requirements, the maximum running time can be adjusted in such a way that, on the one hand, a sufficiently high accuracy of the distance determination is possible. On the other hand, it can be assumed that within the recorded maximum running time a compromise of the UWB signal can be excluded or largely excluded.

Thus, the ID transmitter described above enables the vehicle to determine a selected antenna from the plurality of available UWB antennas, which is then controlled to carry out UWB communication. By selecting a UWB antenna from the available UWB antennas, the implementer of the method is provided with an opportunity for a concrete application to reduce the energy required for UWB communication, depending on one or more previously recorded parameters. Depending on the practicability and/or security needs pursued or to be observed by the implementing developer, different parameters can be used. It is advisable to use a less energy-intensive method than UWB communication for recording these parameters or for using parameters that are already available and have already been recorded. Based on these data, a control device, preferably a vehicle control device, can then be used to determine with which UWB antenna UWB communication is carried out and/or in which sequence the different available UWB antennas are used for an UWB communication.

As indicated above, one possibility involves selecting the UWB antenna, depending on the received signal strength of an LF signal transmitted from the authentication arrangement to the ID transmitter. For this purpose, the ID transmitter described at the beginning, which can be arranged for LF communications, is used. The term LF interface refers to a set of devices required for LF communication and includes at least one LF antenna and a reception circuit coupled with the LF antenna. Such an arrangement is provided in connection with the ID transmitters mentioned above, as well as with the inventive ID transmitters in one of its further developments, as well as in many other cases. For example, an LF signal can be transmitted from one or more LF interfaces of the vehicle authentication arrangement to the ID transmitter, which receives it with an LF reception device and then determines the signal strength. For example, two LF interfaces arranged at different positions of the vehicle can each transmit a differently coded LF signal to the ID transmitter, and the ID transmitter returns the detected signal strength values, for example, in the form of RSSI values, together with the respective code of the ID transmitter, to the HF interfaces on the vehicle. Such data can then be evaluated by a vehicle control device. As a result of the evaluation it can be determined, for example, that the UWB antenna which is closest to the LF interface with the strongest LF signal is primarily controlled from the plurality of UWB antennas of the authentication arrangement.

In a further development of the method, it is provided that first the above steps B) to E) are carried out with a first selected UWB antenna and, if the running time of the UWB signal between the ID transmitter and the first selected antenna is greater than a predetermined maximum running time, at least steps B) to E) are carried out again. Repeating steps B) to E) is performed in contrast to the first performance of steps B) to E) with a second selected UWB antenna, with the objective of checking whether the running time of the UWB signal between the ID transmitter and the second selected antenna is less than the predetermined maximum running time.

It is therefore provided that, in addition to carrying out the inventive method using a first selected antenna, a second UWB antenna of the authentication arrangement on the vehicle is selected in the event of failure to carry out a distance determination. This increases the reliability of the method. In a case in which, for example, the first UWB antenna is shadowed—although this is unlikely—an incorrect distance determination result is avoided even if the ID transmitter is actually sufficiently close to the vehicle. By repeating steps B) to E) sequentially, first with the first UWB antenna and then with the second UWB antenna, a prioritization of the UWB antennas is performed. In many cases, this ensures that the method is already successful with the first selected antenna. The gain in reliability is therefore not accompanied by a disproportionately high increase in energy requirements.

Further details, characteristics, and advantages of the inventive method and its further development are included in the following description in connection with the drawings, in which embodiments of the invention are shown in an exemplary manner.

BRIEF DESCRIPTION OF THE DRAWINGS

It is evident that the characteristics mentioned above, as well as those described below can be used not only in the combination indicated, but also in other combinations or individually. It is shown.

DETAIL DESCRIPTION

Figure 1:
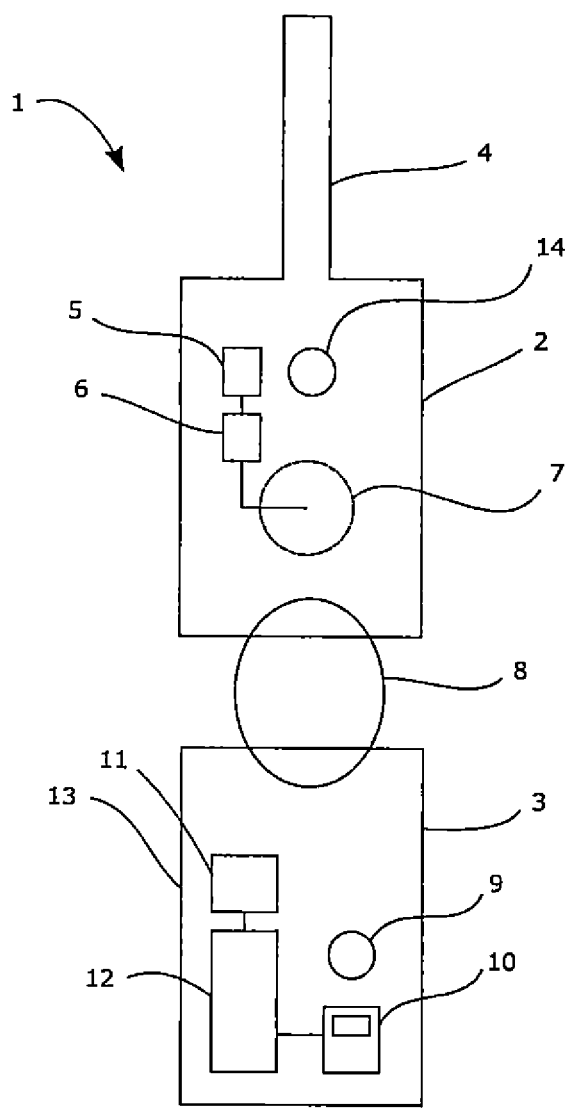
FIG. 1: shows a schematic representation of an inventive ID transmitter and an authentication system of a vehicle.

FIG. 1 shows the key system 1 for an authentication system of a vehicle. The key system 1 comprises an embodiment of the inventive ID transmitter 3 and a second ID transmitter 2. The ID transmitter 3 has a supply battery 9. Also available:
a microcontroller 12,
UWB transmission and reception circuits 11 controlled by and connected to the microcontroller 12 for communication with a vehicle control unit,
an LF reception circuit 10 controlled by and connected with the microcontroller 12 for receiving LF alert signals transmitted in the LF frequency range. In addition, the ID transmitter 3 has a housing 13, which is configured in the form of a closed housing with no operating elements. The second ID transmitter 2 has an HF transmission and reception interface 5, which is controlled by a microcontroller 6 and with which a function of a vehicle is enabled when a button is pressed on the control element 7, which is configured in the form of a button. Only active actuation is provided, but no passive functionality of the second ID transmitter. A key bit 4 is provided for mechanical release of the function. A mechanical coupling element 8 configured in the form of a connecting ring connects the ID transmitter and the second ID transmitter in a manner that they can be disconnected and reconnected. Thus, the ID transmitter functions as a key fob.

Figure 2:
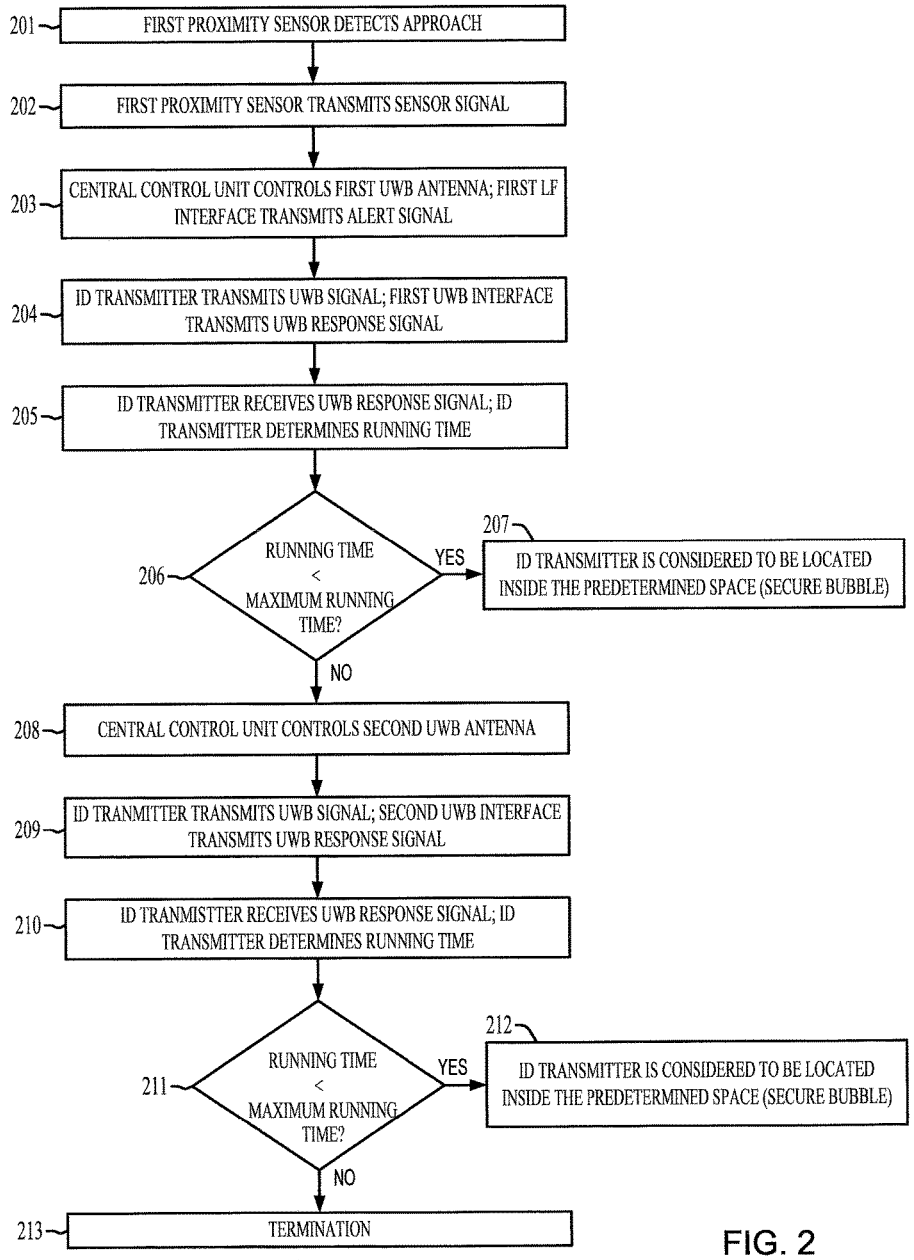
FIG. 2: shows a flow chart of an exemplary sequence of the inventive method.

FIG. 2 involves a first possible manner of procedure of the inventive method using the inventive ID transmitter.

The manner of procedure shown in exemplary fashion provides that in step 201 the approach of an operator to the first proximity sensor is detected. In step 202, the proximity sensor outputs a corresponding proximity signal. By placing and coupling the first proximity sensor and the antenna of the first vehicle UWB interface in the door handle, it is provided that the first control means moves the first UWB antenna from a non-transmission and/or non-reception state to a transmission-ready state (step 203). With a first vehicle LF interface, an LF alert signal is transmitted (step 203) and a vehicle UWB interface is controlled by the first control means for transferring the first vehicle UWB interface from a state, which is not ready for transmission and/or reception to a state which is at least ready for reception. The ID transmitter now transmits a UWB signal, which receives the first vehicle UWB interface. The UWB signal transmitted responds to the UWB interface of the vehicle with a UWB response signal (step 204). The ID transmitter receives the response signal and determines a running time of the UWB signal and the UWB response signal between ID transmitter and first vehicle UWB interface. The ID transmitter transmits the running time or a parameter derived from it, preferably via UWB, to a data receiver of the vehicle (step 205). After the running time of the UWB signal between the ID transmitter interface and the first vehicle UWB interface has been detected, the ID transmitter checks whether the running time of the UWB signal is less than a predetermined maximum running time (step 206). If this is the case (step 207), the ID provider is considered to be located within the room in which a release is enabled (secure bubble). Furthermore, a compromise of the signal, for example by a relay station attack, is not considered to have occurred.

However, if it is determined in step 206 that the running time is greater than the predetermined maximum running time, step 208 continues in the same sequence, but using the second UWB antenna. The UWB signal is then transmitted to the second UWB antenna and the second UWB interface transmits a UWB response signal (step 209). The ID transmitter receives the UWB response and determines a running time (step 210). If the running time is less than a maximum running time (step 211) then the ID transmitter is considered to be located inside the secure bubble (step 212). If the running time is more than the maximum running time, the procedure is terminated (step 213).

The invention claimed is:

1. A portable ID transmitter for an authentication system of a vehicle, the ID transmitter comprising, arranged in a housing:
   a supply battery,
   a microcontroller, wherein
   the microcontroller is configured, when an LF-reception circuit has received an LF alert signal, to transmit a UWB signal for reception by a UWB interface of the vehicle, which is coupled with a vehicle control unit,
   to receive a UWB response signal,
   to detect the time difference between transmitting the UWB signal and receiving the UWB response signal,
   to check whether the time difference or a parameter derived from it does not exceed a predetermined maximum value, and,
   to transmit a radio signal to the vehicle control unit, which has a release value, depending on the result of the test
   wherein the ID transmitter is configured for testing a number of LF signals for an identity identifier, detecting signal strength values for the LF signals and responding to the reception of the LF signals with an HF response signal, which comprises the identification of the LF signal with the strongest signal strength value and/or includes a list of identity identifiers with associated signal strength values,
   wherein a plurality of UWB antennas are spaced apart on the vehicle and the plurality of UWB antennas are prioritized based on the identification of the LF signal with the strongest signal strength and/or the list of identity identifiers with associated signal strength values, as to which of the plurality of UWB antennas are controlled.

2. The ID transmitter according to claim 1, wherein the microcontroller is configured to transmit the UWB signal as a radio signal to the vehicle control unit.

3. The ID transmitter according to claim 1, wherein the microcontroller is configured to transmit an authorization code to the radio signal.

4. The ID transmitter according to claim 3, wherein a challenge-response list is stored on a storage medium of the ID transmitter, which storage medium is coupled with the microcontroller, and that the microcontroller is configured to transmit by means of the radio signal a response value assigned to the challenge value if the UWB response signal comprises a challenge value.

5. The ID transmitter according to claim 1, wherein the UWB response signal is transmitted with a predetermined minimum time interval after the RF response signal.

6. The ID transmitter according to claim 1, wherein the microcontroller is configured to carry out, at least partially in parallel, an LF communication and a UWB communication.

7. The ID transmitter according to claim 1, wherein the LF reception circuit and/or the UWB transmission and reception circuits are configured to assume an energy-reduced state in which they are not ready to receive and to transmit compared with their normal operating state, and in which they are coupled with a motion sensor in such a way that the LF reception circuit and/or the UWB transmission and reception circuits are transferred to the normal operating state when the ID transmitter is moved.

8. The ID transmitter according to claim 1, wherein the ID transmitter is configured in the form of an ID transmitter that can be activated in an exclusively passive manner, and the housing of which is configured with an operating element that cannot be activated manually.

9. The ID transmitter according to claim 8, wherein the ID transmitter has a mechanical coupling element for connecting a key.

10. A vehicle authentication system comprising the ID transmitter according to claim 1 and a second ID transmitter, wherein the second ID transmitter is configured as a manual HF radio key wherein by manual actuation of a button arranged on the second ID transmitter, an HF request signal adapted to the vehicle control unit is transmitted to request a vehicle function, so that the ID transmitter and the second ID transmitter form a key system and are configured for communication with the same vehicle, but not with one another.

11. A method for operating a vehicle authentication system for authenticating a portable ID transmitter to the vehicle to enable vehicle functions for an operator carrying the portable ID transmitter,
   the authentication system comprising the portable ID transmitter and a vehicle authentication arrangement, the authentication arrangement comprising a plurality of UWB antennas having at least a first UWB antenna and a second UWB antenna spaced apart on the vehicle,
   the method comprising the following steps:
   A) selecting a UWB antenna from the plurality of UWB antennas of the authentication arrangement as the selected UWB antenna, wherein the selected UWB antenna is selected at least
      depending on a function of a reception signal strength of an LF signal transmitted between the ID transmitter and an LF interface of the authentication arrangement, and/or
      depending on a function of a reception signal strength of an HF signal transmitted between the ID transmitter and an HF interface of the authentication arrangement, and/or
      depending on a function of a proximity signal from a proximity sensor located on the vehicle;
   B) controlling the selected UWB antenna to perform UWB communication between the ID transmitter and the authentication arrangement;
   C) performing the UWB communication between the ID transmitter and the authentication arrangement;
   D) detecting a running time of a UWB signal of the UWB communication between the ID transmitter and the selected UWB antenna;
   E) checking whether the running time of the UWB signal between the ID transmitter and the selected UWB antenna is less than a predetermined maximum running time.

12. The method according to claim 11, wherein the steps B) to E) are performed with a first selected UWB antenna, and if the running time of the UWB signal between the ID transmitter and the first selected antenna is greater than a predetermined maximum running time, at least steps B) to E) are performed with a second selected UWB antenna to check whether the running time of the UWB signal between the ID transmitter and the second selected antenna is less than the predetermined maximum running time representing a position of the ID transmitter within a predetermined space surrounding the second selected UWB antenna.

* * * * *